July 9, 1946.  T. C. GERNER  2,403,520
DRIVE SHAFT BUSHING ASSEMBLY
Filed July 23, 1945
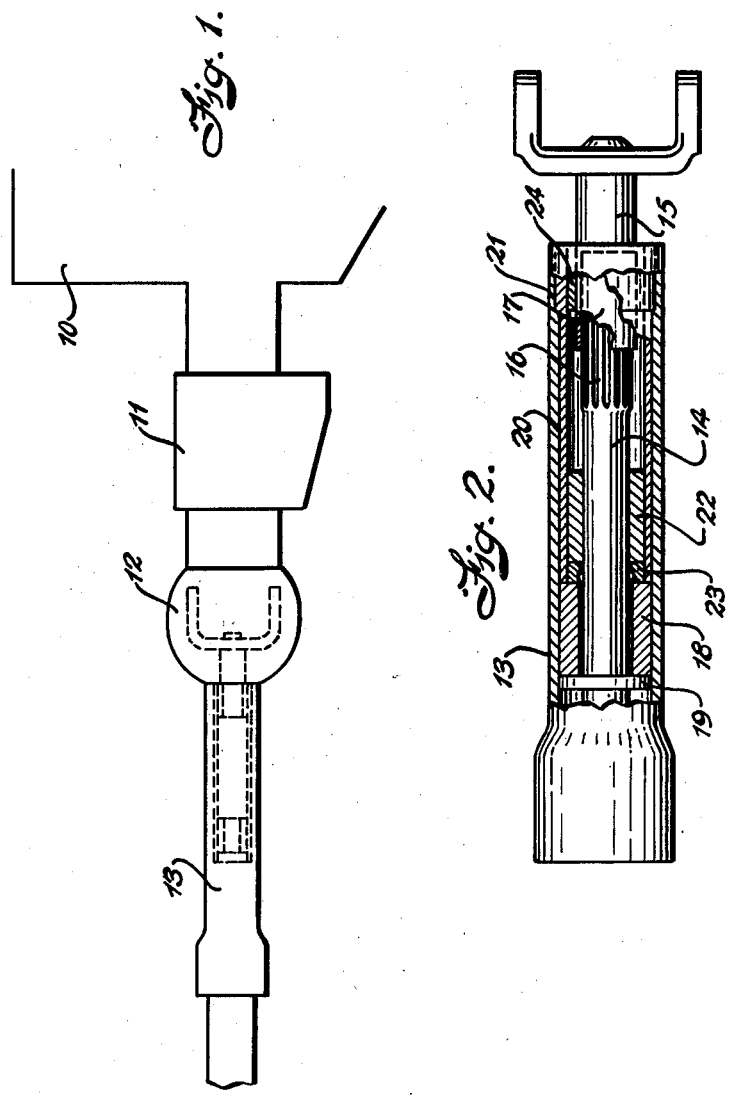
Inventor
Theodore C. Gerner
By Clarence A. O'Brien
and Harvey B. Jacobson
Attorneys Patented July 9, 1946

2,403,520

UNITED STATES PATENT OFFICE 2,403,520

DRIVE SHAFT BUSHING ASSEMBLY

Theodore C. Gerner, Oklahoma City, Okla.

Application July 23, 1945, Serial No. 606,566

14 Claims. (Cl. 308—36.1)

This invention relates to a drive shaft bushing assembly and more particularly to a replacement part adapted for installation in the propeller or drive shaft housing of a motor vehicle adjacent the bell housing which surrounds the universal joint immediately to the rear of the transmission.

The primary object of the invention is to preserve the lubricant in which the transmission gears are normally bathed, and prevent it from escaping through the drive or propeller shaft housing and diluting the grease usually employed in the differential.

Another object is to support the forward end of a propeller shaft out of contact with a bearing which may have become worn and deteriorated through use.

Among its features my invention embodies a sleeve adapted to fit into the forward end of the propeller shaft housing of an ordinary motor vehicle, bearings carried adjacent opposite ends of the sleeve on the interior thereof for sustaining the propeller shaft in axial alignment with the sleeve and with the housing thereof, and a seal carried within the inner end of the sleeve and adapted effectively to prevent the flow of lubricants from the transmission and forward end of the propeller shaft housing back through the rear end of said housing and into the differential housing.

In the drawing:

Figure 1 is a side view illustrating diagrammatically an engine, a transmission housing, a bell housing and the forward end of the propeller shaft housing, and showing in dotted lines the position in which my improved sleeve and bearing assembly are located therein.

Figure 2 is an enlarged side view partially in section of the forward end of the propeller shaft housing, propeller shaft and the U-joint equipped with my improved joint bushings and seal assembly.

Referring to the drawing in detail an engine designated 10 is connected through the usual transmission 11 to the bell housing 12 carried at the forward end of the propeller shaft housing 13 all in the conventional manner. The housing 13 surrounds the propeller shaft 14 which carries at its forward end the conventional forked member 15 of a conventional U-joint housed within the housing 12. As illustrated in Figure 2 the extreme forward end of the propeller shaft 14 is splined as at 16 to receive the splined socket 17 carried by the member 15 previously described so as to establish driving connections between the parts and yet allow the parts to be separated endwise when necessary. Carried within the housing 13 adjacent its rear end is the usual bearing 18 in which the shaft 14 is supported and at the rear end of the bearing 18 is the conventional oil seal 19 which normally prevents lubricant contained within the transmission housing 11 in which the transmission gears are bathed from escaping through the interior of the propeller shaft housing 13 and diluting the lubricant normally contained within the differential housing which is conventionally located at the rear end of the propeller shaft.

The equipment thus far described is that which is commonly employed and in service the bearing 18 and the area of the shaft contacting therewith become worn with the result that replacement of both the bearing and the shaft have heretofore been necessary at more or less frequent intervals. The wearing of these parts also had a tendency to destroy the effectiveness of the oil seal 19 with the result that drainage of the lubricant from the housing 11 through the propeller shaft housing 13 and into the differential housing at the rear end thereof has been experienced.

My invention obviates these difficulties and comprises a main supporting sleeve 20 which is adapted to be driven into the interior of the propeller shaft housing 13 as illustrated in Figure 2. The sleeve 20 is provided adjacent its outer end with a portion 21 of slightly larger diameter than the main body of the sleeve so as to establish a drive fit between the inner surface of the propeller housing 13 and the outer surface of the sleeve. Adjacent the forward end of the housing carried on the interior of the sleeve 20 adjacent its inner end is a bearing 22 having an internal diameter such as to provide an accurate bearing surface for the shaft 14 near that part of the shaft engaged by the bearing 18. An oil seal 23 is fitted into the sleeve 20 between the bearing 22 and the extreme inner end of the sleeve so that when the sleeve 20 is driven into place within the propeller shaft housing the oil seal 23 will be positioned between the bearing 18 and the bearing 22. Fitted in the outer end of the sleeve 20 is a bearing bushing 24 which is of an internal diameter to receive the exterior of the socket 17 of the member 15 so as to insure the accurate running of the socket 17 about the longitudinal axis of the shaft 14. The bearing sleeve 24 serves to stabilize the end of the propeller shaft to which the socket 17 is attached and avoid any danger of whip at the point of junction of the propeller shaft and the sleeve.

In assembling the device within a propeller shaft housing already installed it is unnecessary to remove the propeller shaft as the universal joint is simply uncoupled so as to allow the member 15 and the forward end of the propeller shaft and its housing to be lowered whereupon the socket 17 may be removed longitudinally of the shaft and through the open end of the housing 13. Without removing the propeller shaft or the housing from its connection with the differential housing at the rear end of the vehicle my improved assembly constituting the sleeve 20, the bearings 22 and 24 and the oil seal 23 may be slipped over the end of the shaft into the interior of the housing 13 as illustrated in Figure 2. As the sleeve 20 approaches its innermost position the enlarged portion 21 will encounter the interior of the housing 13 so that the sleeve must be driven into place and a drive fit will be established which will retain the shaft in assembled position. Upon driving the sleeve 20 home it will be obvious that the bearing 22 will support the drive shaft 14 on a fresh unworn surface thus insuring smooth operation of the parts. The bearing member 24 will embrace the sleeve 17 which is next slipped into place over the splined end 16 of the shaft 14 with the result that no tendency of the shaft to whip will be experienced.

While in the foregoing there has been shown and described the preferred embodiment of this invention it is to be understood that minor changes in the details of construction, combination, and arrangement of parts may be resorted to without departing from the spirit and scope of the invention as claimed.

I claim:

1. In an automotive vehicle, a propeller shaft housing, a propeller shaft rotatable in said housing, a journal for said shaft adjacent an end of said housing, a repair unit insertable in said end of said housing, said unit including an open ended sleeve tightly fitting in said housing and with a first end disposed adjacent said journal, and a bearing in said sleeve adjacent said first end for journalling said shaft.

2. In an automotive vehicle, a propeller shaft housing, a propeller shaft rotatable in said housing, a journal for said shaft adjacent an end of said housing, a repair unit insertable in said end of said housing, said unit including an open ended sleeve tightly fitting in said housing and with a first end disposed adjacent said journal, a bearing in said sleeve adjacent said first end for journalling said shaft, and an oil seal received in the first end of said sleeve and positioned between said journal and said bearing.

3. In an automotive vehicle, a propeller shaft housing, a propeller shaft rotatable in said housing, a journal for said shaft adjacent an end of said housing, a repair unit insertable in said end of said housing, said unit including an open ended sleeve tightly fitting in said housing and with a first end disposed adjacent said journal, a bearing in said sleeve adjacent said first end for journalling said shaft, and a cylindrical member splined upon the end of said shaft and a second bearing in a second end of said sleeve and journalling said cylindrical member.

4. In an automotive vehicle, a propeller shaft housing, a propeller shaft rotatable in said housing, a journal for said shaft adjacent an end of said housing, a repair unit insertable in said end of said housing, said unit including an open ended sleeve tightly fitting in said housing and with a first end disposed adjacent said journal, a bearing in said sleeve adjacent said first end for journalling said shaft, a cylindrical member splined upon the end of said shaft and a second bearing in a second end of said sleeve and journalling said cylindrical member, and an oil seal received in the first end of said sleeve and positioned between said journal and said bearing.

5. In an automotive vehicle, a propeller shaft housing, a propeller shaft rotatable in said housing, a journal for said shaft adjacent an end of said housing, a repair unit insertable in said end of said housing, said unit including an open ended sleeve tightly fitting in said housing and with a first end disposed adjacent said journal, a bearing in said sleeve adjacent said first end for journalling said shaft, and an oil seal received in the first end of said sleeve and positioned between said journal and said bearing, said oil seal being conterminous with the open end of said sleeve.

6. In an automotive vehicle, a propeller shaft housing, a propeller shaft rotatable in said housing, a journal for said shaft adjacent an end of said housing, a repair unit insertable in said end of said housing, said unit including an open ended sleeve tightly fitting in said housing and with a first end disposed adjacent said journal, a bearing in said sleeve adjacent said first end for journalling said shaft, and an oil seal received in the first end of said sleeve and positioned between said journal and said bearing, said oil seal being conterminous with the open end of said sleeve and abutting said bearing.

7. In an automotive vehicle, a propeller shaft housing, a propeller shaft rotatable in said housing, a journal for said shaft adjacent an end of said housing, a repair unit insertable in said end of said housing, said unit including an open ended sleeve tightly fitting in said housing and with a first end disposed adjacent said journal, and a bearing in said sleeve adjacent said first end for journalling said shaft, said first end of said sleeve abutting said journal.

8. In an automotive vehicle, a propeller shaft housing, a propeller shaft rotatable in said housing, a journal for said shaft adjacent an end of said housing, a repair unit insertable in said end of said housing, said unit including an open ended sleeve tightly fitting in said housing and with a first end disposed adjacent said journal, a bearing in said sleeve adjacent said first end for journalling said shaft, and an oil seal received in the first end of said sleeve and positioned between said journal and said bearing, said first end of said sleeve abutting said journal.

9. In an automotive vehicle, a propeller shaft housing, a propeller shaft rotatable in said housing, a journal for said shaft adjacent an end of said housing, a repair unit insertable in said end of said housing, said unit including an open ended sleeve tightly fitting in said housing and with a first end disposed adjacent said journal, a bearing in said sleeve adjacent said first end for journalling said shaft, and a cylindrical member splined upon the end of said shaft and a second bearing in a second end of said sleeve and journalling said cylindrical member, said first end of said sleeve abutting said journal.

10. In an automotive vehicle, a propeller shaft housing, a propeller shaft rotatable in said housing, a journal for said shaft adjacent an end of said housing, a repair unit insertable in said end of said housing, said unit including an open ended sleeve tightly fitting in said housing and with a first end disposed adjacent said journal, a bearing in said sleeve adjacent said first end for journalling said shaft, a cylindrical member splined upon the end of said shaft and a second bearing in a second end of said sleeve and journalling said cylindrical member, and an oil seal received in the first end of said sleeve and positioned between said journal and said bearing, said first end of said sleeve abutting said journal.

11. In an automotive vehicle, a propeller shaft housing, a propeller shaft rotatable in said housing, a journal for said shaft adjacent an end of said housing, a repair unit insertable in said end of said housing, said unit including an open ended sleeve tightly fitting in said housing and with a first end disposed adjacent said journal, a bearing in said sleeve adjacent said first end for journalling said shaft, and a cylindrical member splined upon the end of said shaft and a second bearing in a second end of said sleeve and journalling said cylindrical member, said second bearing being conterminous with said second end of said sleeve.

12. In an automotive vehicle, a propeller shaft housing, a propeller shaft rotatable in said housing, a journal for said shaft adjacent an end of said housing, a repair unit insertable in said end of said housing, said unit including an open ended sleeve tightly fitting in said housing and with a first end disposed adjacent said journal, a bearing in said sleeve adjacent said first end for journalling said shaft, and a cylindrical member splined upon the end of said shaft and a second bearing in a second end of said sleeve and journalling said cylindrical member, said second bearing being conterminous with said second end of said sleeve, and an oil seal received in the first end of said sleeve and positioned between said journal and said bearing.

13. In an automotive vehicle, a propeller shaft housing, a propeller shaft rotatable in said housing, a journal for said shaft adjacent an end of said housing, a repair unit insertable in said end of said housing, said unit including an open ended sleeve tightly fitting in said housing and with a first end disposed adjacent said journal, a bearing in said sleeve adjacent said first end for journalling said shaft, and a cylindrical member splined upon the end of said shaft and a second bearing in a second end of said sleeve and journalling said cylindrical member, said housing being of enlarged internal diameter at said end thereof and said sleeve being of correspondingly enlarged external diameter adjacent its second end to tightly seat in said enlarged end of said housing.

14. In an automotive vehicle, a propeller shaft housing, a propeller shaft rotatable in said housing, a journal for said shaft adjacent an end of said housing, a repair unit insertable in said end of said housing, said unit including an open ended sleeve tightly fitting in said housing and with a first end disposed adjacent said journal, a bearing in said sleeve adjacent said first end for journalling said shaft, and a cylindrical member splined upon the end of said shaft and a second bearing in a second end of said sleeve and journalling said cylindrical member, said housing being of enlarged internal diameter at said end thereof and said sleeve being of correspondingly enlarged external diameter adjacent its second end to tightly seat in said enlarged end of said housing, and an oil seal received in the first end of said sleeve and positioned between said journal and said bearing.

THEODORE C. GERNER.